United States Patent [19]
Holmes

[11] Patent Number: 5,649,079
[45] Date of Patent: Jul. 15, 1997

[54] COMPUTERIZED METHOD USING ISOSCELES TRIANGLES FOR GENERATING SURFACE POINTS

[76] Inventor: David I. Holmes, P.O. Box 323, Uncasvile, Conn. 06382

[21] Appl. No.: 202,385

[22] Filed: Feb. 28, 1994

[51] Int. Cl.$^6$ .................................................. G06T 15/00
[52] U.S. Cl. ........................ 395/123; 395/119; 395/120; 395/125
[58] Field of Search .................................... 395/125, 119, 395/120, 123, 127, 133; 382/154, 285, 286; 364/474.24

[56] References Cited

U.S. PATENT DOCUMENTS

| | | | |
|---|---|---|---|
| 4,205,383 | 5/1980 | Bakanovich et al. | 364/554 |
| 4,258,478 | 3/1981 | Roane | 434/94 |
| 4,603,431 | 7/1986 | Grover et al. | 382/241 |
| 4,608,653 | 8/1986 | Setoguchi | 395/119 |
| 4,631,690 | 12/1986 | Corthout et al. | 395/120 |
| 4,759,075 | 7/1988 | Lipke et al. | 382/288 |
| 4,790,629 | 12/1988 | Rand | 364/514 A |
| 4,811,237 | 3/1989 | Putatunda et al. | 364/491 |
| 4,819,161 | 4/1989 | Konno et al. | 364/191 |
| 4,864,520 | 9/1989 | Setoguchi et al. | 364/560 |
| 4,888,814 | 12/1989 | Yamaguchi et al. | 382/197 |
| 4,912,664 | 3/1990 | Weiss et al. | 364/577 |
| 4,933,889 | 6/1990 | Meshkat et al. | 364/578 |
| 4,941,114 | 7/1990 | Shigyo et al. | 364/578 |
| 4,999,789 | 3/1991 | Flasconaro | 395/127 |
| 5,010,501 | 4/1991 | Arakawa | 395/120 |
| 5,023,800 | 6/1991 | Carver et al. | 364/474.24 |
| 5,043,915 | 8/1991 | Suwa et al. | 395/52 |
| 5,119,309 | 6/1992 | Cavendish et al. | 364/474.24 |
| 5,125,038 | 6/1992 | Meshkat et al. | 382/154 |
| 5,150,457 | 9/1992 | Behm et al. | 395/120 |
| 5,175,601 | 12/1992 | Fitts | 356/376 |
| 5,189,626 | 2/1993 | Colburn | 364/474.24 |
| 5,214,752 | 5/1993 | Meshkat et al. | 395/123 |
| 5,222,202 | 6/1993 | Koyamada | 395/123 |
| 5,307,450 | 4/1994 | Grossman | 395/123 |
| 5,416,729 | 5/1995 | Leon et al. | 364/578 |

OTHER PUBLICATIONS

Foley et al., Computer Graphics: Principles and Practice, Addison–Wesley Co. Inc., 1993, pp. 527,528.

p. 74, Mechanical Engineering, "Much Ado About NURBS," Sep. 1992;.

pp. 113–124, pp. 215–219, Geometric Modeling, (John Wiley & Sons), by Mortenson;.

*Primary Examiner*—Heather R. Herndon
*Assistant Examiner*—Stephen Hong
*Attorney, Agent, or Firm*—Robert S. Smith

[57] ABSTRACT

A computerized method employing isosceles triangles for generating boundary surface points includes providing an electronic computer system having instructions and data for performing steps, and then performing those steps by executing the instructions and data in the computer system. Each isosceles triangle employed in the method has two congruent legs and an incongruent base. The steps include detecting a closed edge, determining a base figure having a perimeter, generating after the determining step a first group of isosceles triangles having vertices coincident with the closed edge and having bases formed by and equal to the perimeter, determining a location vector formed by a unitized cross product of first line segments which connect the vertices of the first group of triangles. The steps further include generating a second group of isosceles triangles having a common vertex on the vector at a location outside of a plane containing at least portions of the perimeter, the second group of isosceles triangles having bases formed by the first line segments; calculating a first ratio of sums of heights of the first group of triangles, calculating a second ratio of heights of the second group of triangles, comparing the ratios, moving the common vertex along the vector until the common vertex is positioned at a second location. Thereafter, the method generates a boundary surface point at the second location.

15 Claims, 22 Drawing Sheets

Microfiche Appendix Included
(1 Microfiche, 64 Pages)

FIG. 4-1
Generation of Base Figure
Initiation of the Knowledge Base

---
Place the first corner on an edge point with tangents forming the closest angle to 90 degrees
↓
Place corners 2, 3, and 4 five, ten, and fifteen percent respectively of the edge length on the original edge
↓
10 Coarse Corner Placement
↓
20 Fine Corner Placement
↓
30 Inference of Proportionality

---

21 Generate vertex scaler paths of base figure (e.g. quad) corners

---
Extend the scaler direction from a base quad corner toward the edge loop end and backwards toward the beginning of the first quad base corner on the surface edge
↓
Record the direction about the coarse vertex corner placement of the scaler variation
↓
Decrease the distance that a corner point is adjusted by after one increment forward and the following reverse increment

---

22 Save Quad Base

---
Calculate the difference in the base quad perimeter from the previous base quad perimeter
↓
Calculate the difference in the vertex angle from the previous base quad
↓
Calculate the difference in the projection ratios from the previous base quad
↓
If all three differences are less than or equal to zero then save the new base quad

FIG. 4-2

10 Coarse Corner Placement

> Adjust the location of the fourth, third, and second base quad corners away from the first corner along the surface edge
> ↓
> Save the base quad with the most perpendicular base quad vertex angles and largest perimeter 20 Fine Corner Placement > Adjust the location of each base quad vertex corner within the edge interval of the corners on either side
> ↓
> 21 Generate vertex scaler paths of base quad corners
> ↓
> 22 Save Base Quad 30 Inference of Proportionality > Find the closest scaler data in the knowledge base with the current quad base data
> ↓
> Match the scaler paths with the corresponding 2, 3, and 4 base quad corners from the knowledge base with the current base quad
> ↓
> Adjust the 2, 3, and 4 quad corners by repeating the paths gotten from the knowledge base starting with a small scaler increment
> ↓
> 22 Save Quad Base
> ↓
> Increase the size of the increment
> ↓
> Store the quad base that satisfies the conditions in 22 Save quad base to the knowledge base

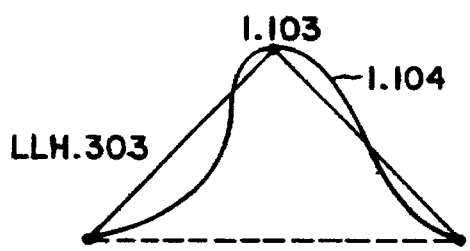
FIG. 5A
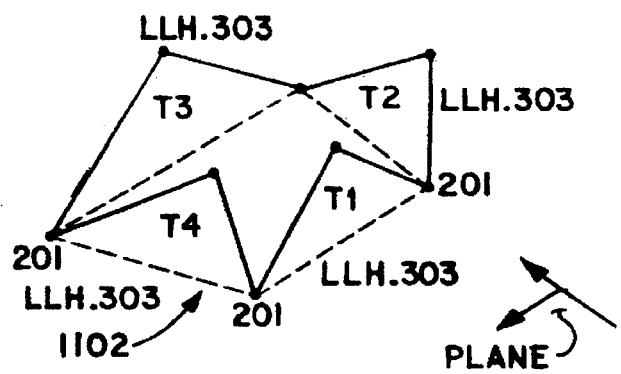
FIG. 5B
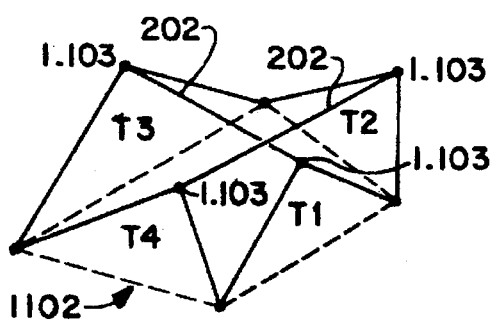
FIG. 5C
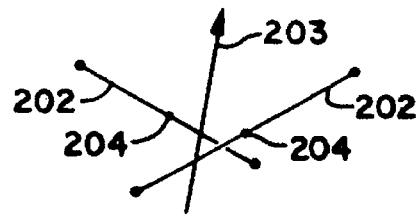
FIG. 5D
$$\frac{h_1 + h_3}{h_2 + h_4}$$
FIG. 5E
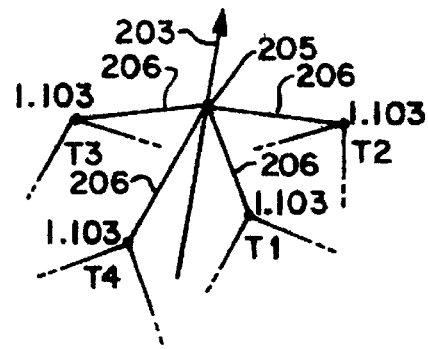
FIG. 5F
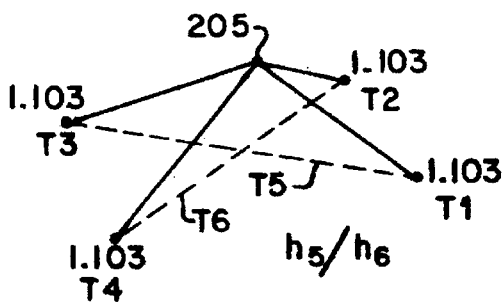
$h_5/h_6$
FIG. 5G
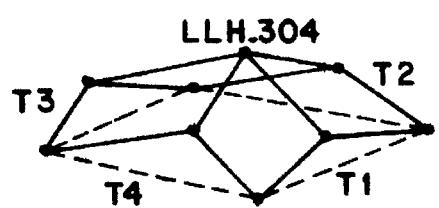
FIG. 5H IF $t_a < t_b$, THEN $t = t_a$
ELSE $t = t_b$

FIG. 9-1

E1 Calculate Percent Similarity

---
Get the list location of the parent parameter 501
↓
Get the list location of the child parameters 503
↓
Calculate the percent difference of list location from the parent 501 to the child parameter

---

E2 Collect the Identical Parent and Child Parameters

---
Match the groups of identical parameters 503
↓
Separate the parent parameters into groups of identical data 603
↓
Reorder the list of each group 603 in ascending decrease of the combined percent difference

---

E3 Convert the Parameter Connectivity to a Generalization

---
Replace each percent line with the connectivity line 602
↓
Replace the percent reference between parent 501 and the child parameters 503 with a connectivity line 602
↓
Separate the generalizations 1505 from the parameter lists

---

E4 Transform the Generalization to a Path

---
Match the record of process events onto the parameters 1501
↓
Combine the generic labels 1504 of the process record with the parameters 1501
↓
Remove the path section 1502 containing the largest full section of labels 1504 to parameter 1501 matches

FIG. 9-2

E Scalar Data Association

---
E1 Calculate Percent Similarity
↓
E2 Collect the Identical Parent and Child Parameters
↓
E3 Convert the Parameter Connectivity to a Generalization
↓
E4 Transform the Generalization to a Path
---

Fig. 10

F1 Increment Change of a Magnitude on a Vector

---
Place a unit direction vector (length is one) coincident with a line 7A.LLS.201 at a starting origin point 7A.LLS.203
↓
Project a magnitude length 7A.SSL.102 onto the unit vector
↓
Alter the line 7A.LLS.202 to the new vector position

---

F2 Consolidate Surface Data into One Data Structure

---
Generate a surface point 5A.2.A-G
↓
Store the six isosceles triangles 5.2.G into the first element LLH.302 of array HHL.301
↓
Recompose the surface in successive surface quarter sections 5B.3.A-F
↓
Store the four surface sections into the corresponding array location 7A.HHL.401

---

F3 Determine Scalar Path Remainder

---
Set the connectivity of the path parameter data 7A.HHS.500, 501 describing the peripheral data about the current path point
↓
E1 Calculate Percent Similarity
↓
E2 Collect the Identical Parent and Child Parameters
↓
E3 Convert the Parameter Connectivity to a Generalization
↓
Get the magnitude difference 7A.SSH.601 of parameters 7A.SSH.501
↓
Separate remaining scalar magnitude path difference of the parameters relative to the desirable configuration 7A.SSB.701
↓
Increment the current parameter point 7A.SSH.501 by the scalar path 7A.SSB.701 in the positive direction 7A.BBS.801
↓
E1 Calculate Percent Similarity
↓
If the percent difference is less then Keep the positive direction
    else Switch to the negative direction 7A.BBS.801

FIG. 11-1

F4 Maintain Path Point Record Local Parameter Connectivity

---
Include the true or false boolean label of inclusion of a single path point 7B.LLB.502 reference to a parameter 7B.LLB.501
↓
Combine the set of path references LLB.901, 902 into one set.

---

F5 Label the Direction of Path Inference

---
Label the direction 7B.HHB.1102 of a path 7B.HHB.1103 section from one path point to the other point as an affirmative direction 7B.HHB.1102
↓
Label the inference 7B.BBH.1201 true 7B.BBH.1202 to the new path point induction
↓
Switch the direction of the inference label 7B.BBH.1202 if the inference is rejected

---

F Processing Data with Path Primitives

---
F1 Increment Change of a Magnitude on a Vector
↓
F2 Consolidate Surface Data into one Data Structure
↓
F3 Determine Scalar Path Remainder
↓
F4 Maintain Path Point Record Local Parameter Connectivity
↓
F5 Label the Direction of Path Inference

---

G Combine Similar Path Structures

---
Verify (1) identical parameter types exist in two point of a path section for the path in the KB and the current path
↓
Verify (2) identical direction from one point to the other
↓
Substitute the intermediate path section within two points from the KB into the current path section

---

H1 Verify a Label

FIG. 12

H2 Mark Child Points Data Referable to the User

---
Mark all data inherited beneath the parent label 57a.5709 to be referenced to the user
↓
Set up the path extension 57b.4101
---

H Final Discretization

---
H1 Verify a Label
↓
If the label 57a.5709 was affirmed then
    H2 Mark Child Points Data Referable to the User
↓
Set up the path extension 57c.4103 as the label to go to the KB for further refinement of the parent label 57a.5709
---

I Combining Data Representing Path Details

---
G Combine Similar Path Structures
↓
Separate the binary path structure 57d.5705 the path 57e.5706
↓
Locate the point on the serial path section 57e.5706 containing the induced section
↓
Determine whether the path section location is prior or after the shift 57e.5708 to the user 57a.4102
↓
If prior, then
    add the path section into the 57e.5706 serial section
    else
        Add the path section into the 57a.5706 serial section after the 57e.5708 path point
        ↓
        Get the user response 57a.4102 for continuation of adding in the path section.
---

$$A = \frac{ABS(U \cdot DOT\ V)}{LENGTH(U) \times LENGTH(V)}$$

$P = l1 + l2 + l3 + l4$

COMPUTERIZED METHOD USING ISOSCELES TRIANGLES FOR GENERATING SURFACE POINTS

CROSS REFERENCE TO RELATED APPLICATION

This Application is related to commonly owned copending application Ser. No. 07/823,109 filed Jan. 22, 1992, entitled METHOD FOR DECOMPOSITION TO DEFINE FINITE ELEMENTS WITHIN A SURFACE OR VOLUME.

Appendix

A microfiche (1 microfiche, 64 frames) appendix with a computer program listing has been filed in the United States Patent and Trademark Office.

BACKGROUND OF THE INVENTION

1.) Field of the Invention

The present invention relates to figure surface point generation and, more particularly, to generating surface points which form surface boundaries or surface contours of two or three dimensional figures in, for example, a two dimensional space.

2.) Description of the Prior Art

Representing three dimensional figures in a two dimensional space is common, for example, in Computer Aided Design (CAD), Computer Aided Manufacturing and the like. Typical CAD systems include a microcomputer coupled to an input device (e.g., a keyboard), an output device (e.g., a video display), and to a memory for storing suitable instructions and data for generating surfaces, plane or solid figures other graphics and the like.

Some known CAD techniques employ nonuniform rational B-splines (NURBS) and other modeling techniques which permit describing virtually any type of curves or curved surface, from simple 2-D circles to complex, doubly curved sculptured surfaces. See, for example, GEOMETRIC MODELING, by Michael E. Mortenson, (John Wiley & Sons, N.Y., 1985); CURVES AND SURFACES FOR COMPUTER AIDED GEOMETRIC DESIGN, by Farin, G., (Academic Press, San Diego, 1988); COMPUTER AIDED DESIGN, Piegel and Tiller, (November 1987, Vol. 19; and U.S. Pat. Nos. 5,119,309, FEATURE BASED METHOD OF DESIGNING AUTOMOTIVE PANELS, Jun. 2, 1992, Cavendish et al; 4,999,789, METHOD AND APPARATUS FOR TRIMMING B-SPLINE DESCRIPTIONS OF PATCHES IN A HIGH PERFORMANCE THREE DIMENSIONAL GRAPHICS SYSTEM, Mar. 12, 1991, James Flasconaro; 4,864,520, SHAPE GENERATING/CREATING SYSTEM FOR COMPUTER AIDED DESIGN, COMPUTER AIDED MANUFACTURING, COMPUTER AIDED ENGINEERING AND COMPUTER APPLIED TECHNOLOGY, Sep. 5, 1989, Setoguchi et al; 4,631,690, MULTIPROCESSOR COMPUTER SYSTEM FOR FORMING A COLOR PICTURE FROM OBJECT ELEMENTS DEFINED IN A HIERARCHIC DATA STRUCTURE, Dec. 23, 1986, Cortbout et al, all of which examples are herein incorporated in their entireties by reference.

Although the prior art arrangements are useful, the present inventor believes that they have not been entirely satisfactory because they require extensive core data bases of stored surfaces (fundamental or otherwise) and/or very complicated interpolation polynomials to create boundary surfaces.

The present inventor believes that further improvements in methods for determining or generating surface points are achievable.

SUMMARY OF THE INVENTION

It is a principal object of the present invention to generate surface boundaries of two or three dimensional figures without requiring extensive core data bases or unduly complicated polynomials to position boundary surface points.

According to the present invention, a method for generating boundary surface points, includes: detecting a closed edge; determining an optimum base figure for the closed edge; locating a boundary surface point, and then generating a surface point at the new location. The locating step includes: generating a first plurality of isosceles triangles; determining a location vector; generating a second plurality of isosceles triangles, the second plurality of isosceles triangles having a common vertex on the location vector and having bases formed by segments connecting vertices of opposed triangles of the first plurality; comparing heights of the first and second pluralities of triangles; and then relocating, dependent upon the result of the comparing step, the common vertex to a new location on the location vector.

In general, the present invention composes a boundary surface by causing the positioning and generation of a multiplicity of surface points resulting from repetitive employments of groups of isosceles triangles. Each employment results in a new surface point for the boundary. The method is straightforward, and is readily implemented in software combined with conventional electronic computer hardware by those skilled in the art.

The method of the present invention exploits the extensive structure inherent in combined isosceles triangles. A boundary surface is modeled employing repetitive groups of isosceles triangles whose peak points or vertices are either coincident with points on the closed edge or used to position or locate a boundary surface point. Typically, the closed edge is created by a user employing a light pen, mouse, keyboard or other input device when the method is implemented in software stored within an electronic computer (e.g., personal computer/workstation) system.

Some prior art (CAD) arrangements have recognized benefits of isosceles triangles; see, e.g., U.S. Pat. No. 4,864,520 previously incorporated by reference. However, the present inventor believes that the prior art does not employ such benefits in a manner as set forth in the present invention.

Further and still other objects and features of the present invention will become more readily apparent in view of the following detailed description in combination with the accompanying drawing, in which:

BRIEF DESCRIPTION OF THE DRAWING

FIG. 4-1 and FIG. 4-2, collectively referred to herein as FIG. 4 shows a high level flow diagram further explaining various of the steps of FIG. 3.

FIG. 9-1 and FIG. 9-2 collectively referred to herein as FIG. 9, FIG. 10, FIGS. 11-1 and 11-2 collectively referred to as FIG. 11, and FIG. 12 are high level flow charts further explaining the steps of FIG. 8;

DETAILED DESCRIPTION OF PREFERRED EMBODIMENTS AND BEST MODE

Figure 2:
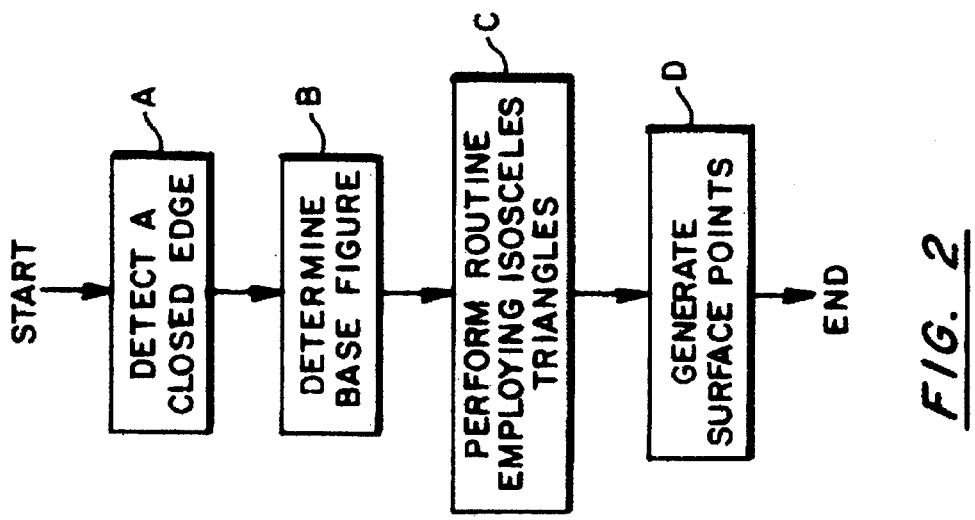
FIG. 2 is a high level flowchart of a preferred method according to the present invention.
Figure 1:
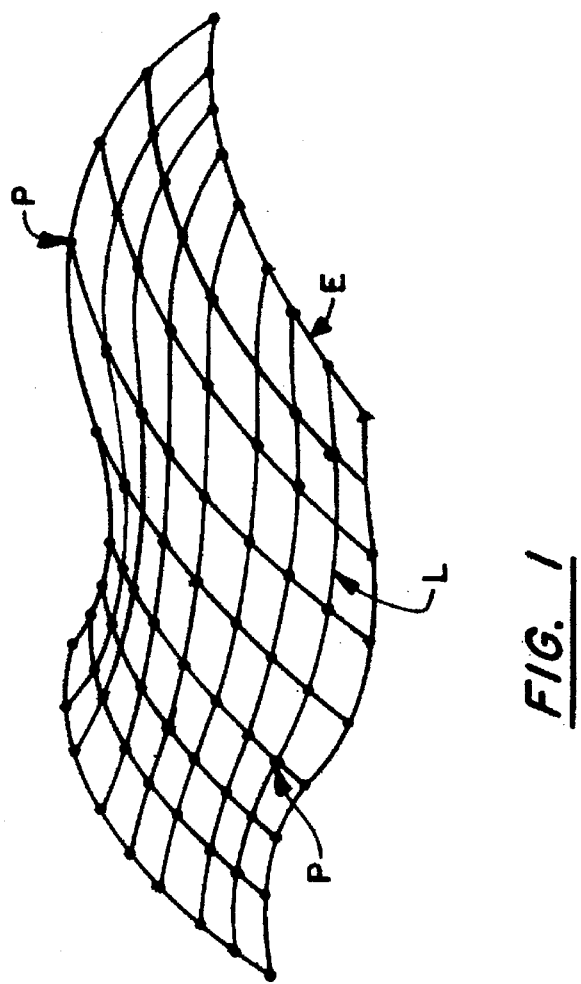
FIG. 1 is a perspective view of a closed edge E having a multiplicity of surface points P positioned according to the method of the present invention.

FIG. 1 shows a resultant closed edge E with a multiplicity of boundary surface points P located and generated according to the preferred method of FIG. 2. Optional connection lines L are generated by any well known technique, e.g., line generating software.

Figure 3A:
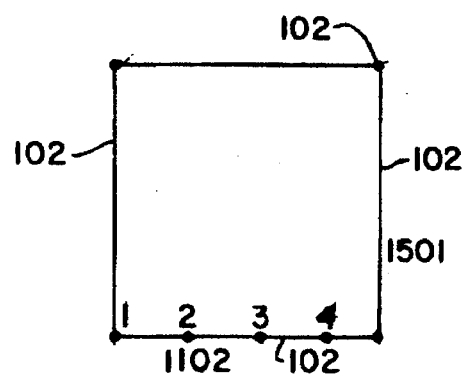
FIG. 3 shows a series of diagrams explaining essential (B1,B2a,B2b,B2c) and optional (B3a,B3b,B4a,B4b,B5) steps for the step B of FIG. 2.
Figure 3B:
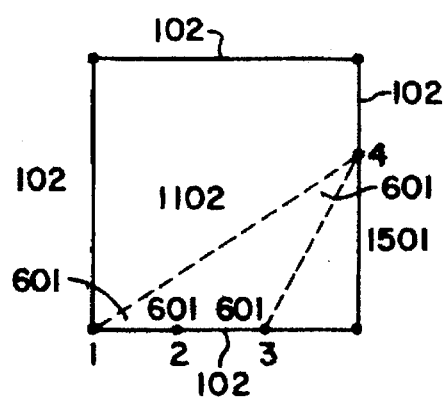
Figure 3C:
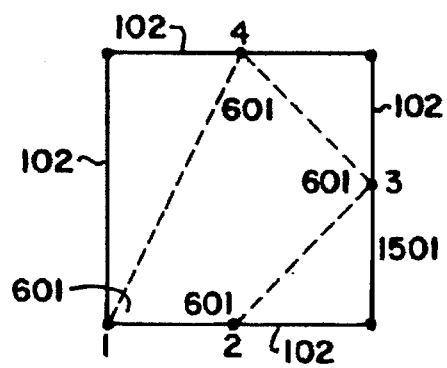
Figure 3D:
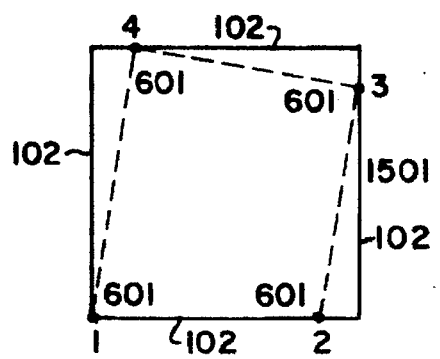
Figure 3E:
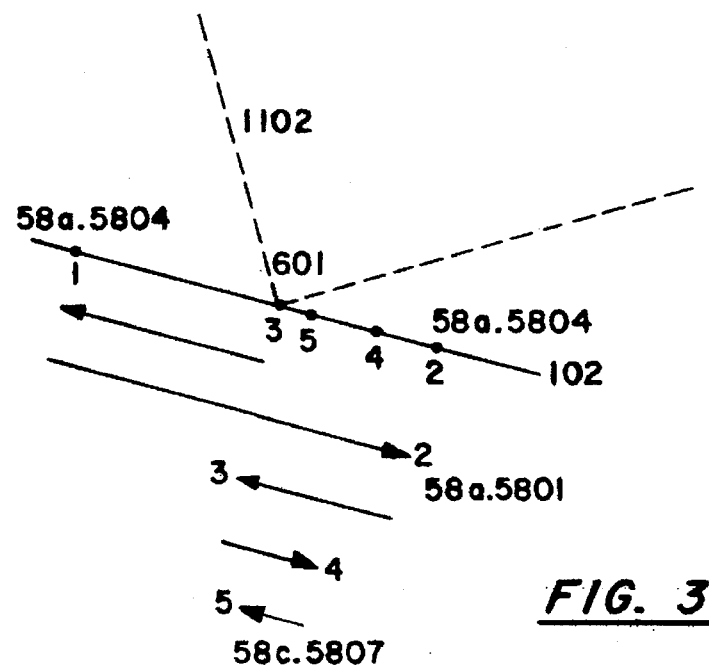
Figure 3F:
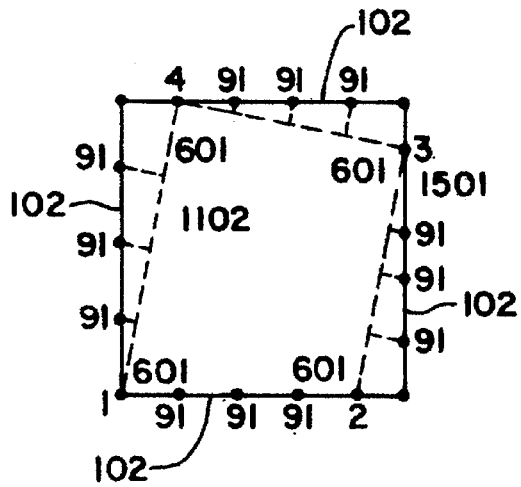
Figure 3G:
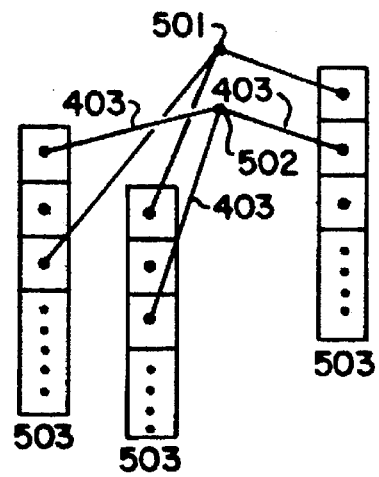
Figure 3H:
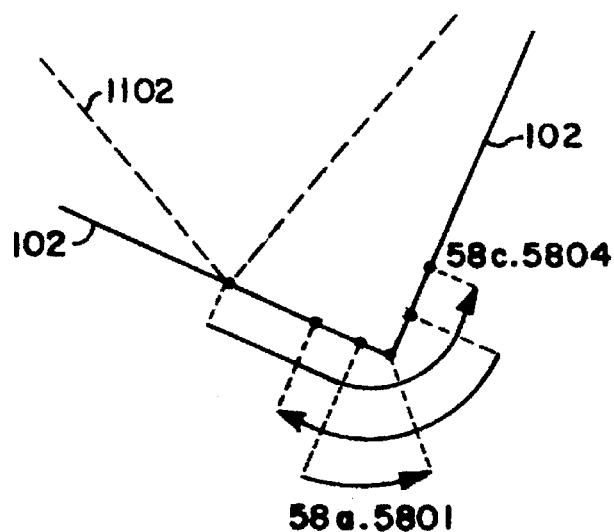
Figure 3I:
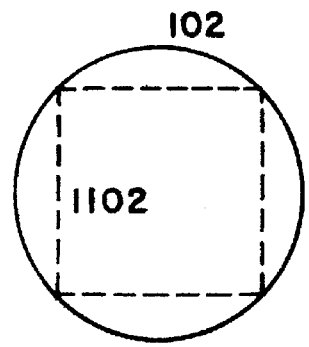

In FIG. 2, a closed edge (e.g., 102 FIG. 3) is detected by any conventional means such as coincidence detection software. Once a closed loop is detected, the method performs the essential steps B1 (FIG. 3A), B2a (FIG. 3B), B2b (FIG. 3C), B2c (FIG. 3D) of FIG. 3 (hereinafter described) corresponding to step 10 of FIG. 4 to determine an optimum base figure (e.g. 1102, FIG. 3I) for a particular closed edge (original surface edge 102). For a further refinement to determine the optimum base figure, the optional step B3b (FIG. 3F) is performed which calculates projection ratios (projections). Projections terminating at points 91 are calculated as the length from the dot product projection (DOT) onto the base FIG. 1102 edge and the triangle peak points on an original edge 102 where that length is divided by the distance along the base FIG. 1102 edge.

$$DOT=(91-CORNER_i)\cdot(CORNER_{i+1}-CORNER_i)\|CORNER_{i+1}-CORNER_i\|;$$

$$RATIO=|91-(((CORNER_{\sigma+1}-CORNER_i)\|CORNER_{i+1}-CORNER_i\|)*DOT)\|/DOT;$$

Thus, according to the preferred embodiment, an optimum base figure has (i) a largest perimeter within the original surface loop (original closed edge), (ii) vertex angles each closest to 90 degrees, and (iii) base figure edges most parallel to the edges of the original surface loop. One preferred method to determine (iii) is by means of the step B3b of FIG. 3F. Of course, one or more of these scalar parameters (i), (ii) or (iii) can be used to determine an optimum base figure. See also FIG. 6 and FIG. 17 (both hereinafter described) for a further example of determining a base figure, e.g. a base quadrilateral within various original surface loops (original closed edges).

This example according to the invention fits a base quadrilateral in a closed loop of edges. Characteristics of the quad that produce the best surface grid configuration or surface points are, for example: (i) perpendicular angles at each of the four corners, (ii) the largest possible quad perimeter, and (iii) the edge placement running most parallel to the original surface edges. The method produces a variety of quads, and selects the optimum quad position in a closed loop of edges. The process is linear, and the scalar variations converge to true and false data structures. A property that is manifested by the method is the creation of discrete voids in the form of coarse scalar increments into which the boolean data fits. A coarse delta t parameter along the parametric equivalent of the original surface loop forms voids in the process that the boolean description of scalars partially fills with regards to a practical application as described herein e.g., FIG. 6.

More specifically, in the steps of FIG. 3:

B1 (FIG. 3A) Initial base quad corner placement 1,2,3, and 4 is set along the original surface edge 102 a small percentage of the total loop length.

B2a (FIG. 3B) Adjust the location of corner 4 moving the point a coarse percent of the total edge length forward on the edge 102 loop (10 Coarse Corner placement FIG. 4).

B2b (FIG. 3C) Continue adjusting the location of the 2 and 3 base quad corners following the relocation of corner 4. (10 Coarse Corner Placement).

B2c (FIG. 3D) Save this base quad 1102 with the vertex angles 601 closest to perpendicular, and having the longest perimeter (10 Coarse Corner Placement).

B3a (FIG. 3E) Altering the direction 58a.5801 of adjustment of a base quad 1102 corner on the original edge 102 from forward on the surface loop to the reverse direction is the path of scalar development 58c.5801 (20.21 generate vertex scalar path of base quad corners).

B3b (FIG. 3F) Save the base quad 1102 having the largest perimeter, vertex angles 601 closest to perpendicular, and the smallest projections 91.

B4a (FIG. 3G) Generate a list of the previously developed base quads 5.502 that have the most similarity with the current base quad 5.501 corresponding to the parameter 503: vertex angle 601, quad base 1102 perimeter, and projection ratios 91.

B4b (FIG. 3H) Adjust the vertex corner of the base quad 1102 by substituting an initial small scalar increment into the scalar path gotten from the comparable knowledge base surface B4a.502.

B5 (FIG. 3I) The knowledge base is started with the quad base data of an edge surface outline of a circle because of its symmetry and similar characteristics with any surface having approximately equal edge lengths.

Figure 6A:
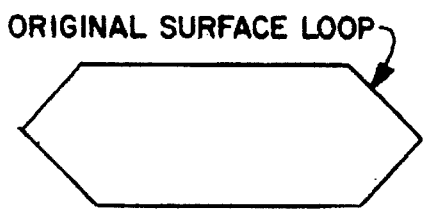
FIG. 6 shows diagrams which explain a further example for determining an optimum base quadrilateral within a closed edge.

In the steps of FIG. 6:

Step 1: Parameterize the original surface loop of successive edge line segments total length to 1. (FIG. 6A).

Figure 6B:
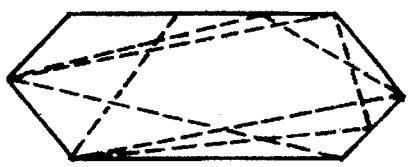

Step 2: Set delta t to a value that will produce a varied spread of potential quad bases where delta t is to be much larger than the delta t calculated in Step 5. (FIG. 6B).

Step 3: Maintain a list of (a list length of 5 is selected) quads such that the quads are ordered with decreasing proximity to the largest quad perimeter and having the closest vertex angles to 90 degrees removing any quad falling below the fifth position in the list. (FIG. 6C).

a) Scalar data is being produced;

b) Inference is in the form of creating the quadrilaterals within the loop compatible with the LLS, SSL to LLH, HHL section of the generalization element; and c) External parameters are applied as in the perimeter length and vertex angle magnitude i.

Figure 6D:
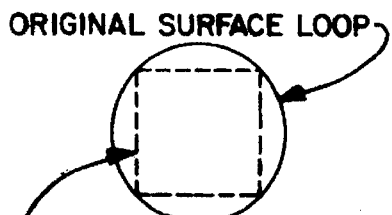

Step 4: Select the quad having the largest perimeter. FIG. 6D a) Selection of a quad using one parameter is the act of using the parameter as a label and focusing on particular data defined as a magnitude within the label generalization.

Figure 6E:
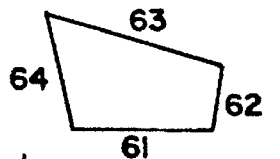

Step 5: Calculate a new t increment as a function of the smallest adjacent parametric quad corner location on either side of a corner. FIG. 6E.

a) Decrease the delta t by a small percent of the original so that the placement of a corner won't overlap adjacent corners.

Figure 6F:
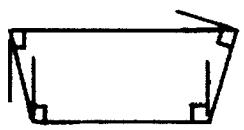
Figure 6G:
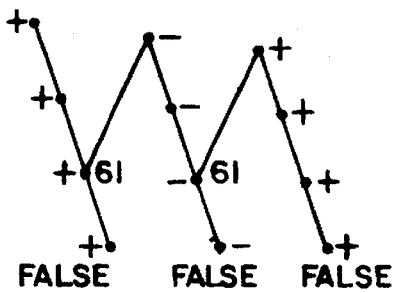
Figure 6H:
Figure 6I:
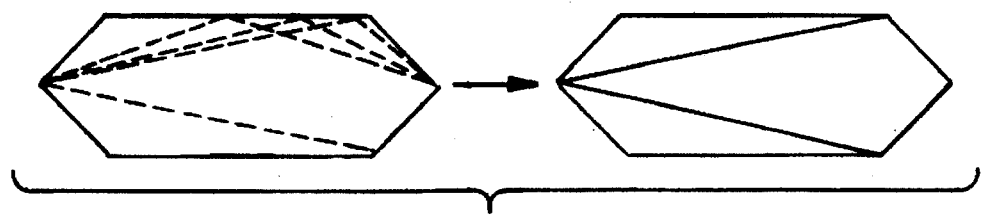
Figure 6J:
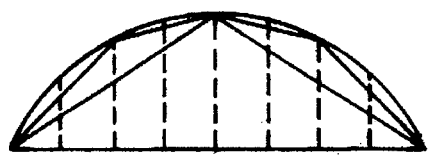

Step 6: Shift the location of each corner point the delta t parameter association with it in the positive (true) or negative (false) parameter increment from the current corner location testing each new quad for a larger perimeter, closer to perpendicular angles, and quad edges running more parallel to the original surface edges. FIG. 6F.

a) Miniature paths are formed by maintaining a true or false recording of whether the current path is convergent to within one of the three scalar comparisons where divergence (false with a true previous comparison) is a path break (61) from the HHS-SSH, BBS-SSB section of the generalization element. FIG. 6G.

b) Both true and false directions of a corner delta t are tested and the delta t is decreased by half of the current magnitude on the full set of a return to a true path direction. FIG. 6H.

c) Random comparison of three scalar parameters is a mino-function in context with the fact that the data converges to a boolean path description of the corner location of a base quad thereby converging to compatibility with the generalization element automatically aligning a quad base with original loop vertex corners. FIG. 6I.

d) Projections are the minimum distance from an outer most layer of isosceles triangles peak points to a quad edge that is the base line to the triangles where each distance is divided by the base line length producing a percent ratio. FIG. 6J.

Figure 6K:
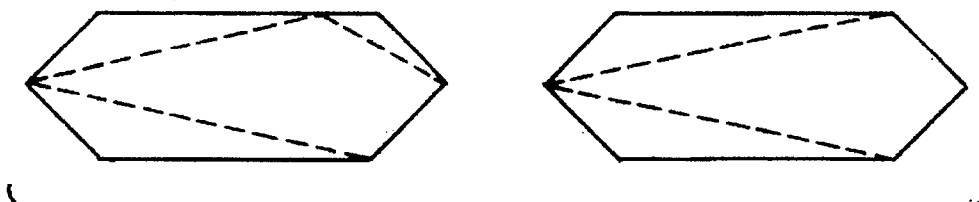

Step 7: Move the quad corner points to the nearest original vertex in the edge loop. FIG. 6K.

Figure 6L:
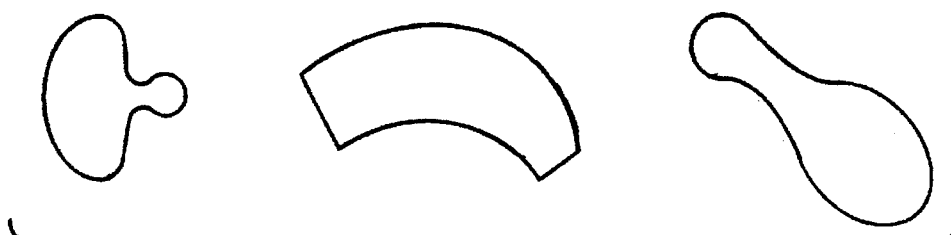
Figure 6M:
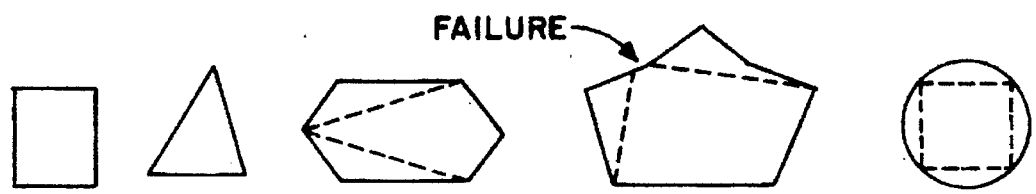

Step 8: Test a wide range of surfaces to verify the general nature of the process.

a) Out of seven (7) surfaces only one failed even at ⅓ of an incomplete process.

b) Interaction is necessary for extrusions. FIG. 6L.

c) Test configuration. FIG. 6M.

Figure 17A:
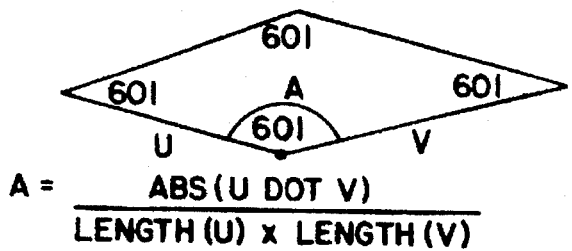
FIG. 17 shows diagrams of a preferred process for determining vertex angles 6.1 (FIG. 17A), diagonals 7.1 (FIG. 17B), perimeters 8.1 (FIG. 17C) and projections 9.1 (FIG. 17D), 9.2 (FIG. 17E) for a base figure (quadrilateral)

In the diagram of FIG. 17:

6.1 Vertex angles 601 are the cosine of the angle gotten with the dot product. FIG. 17A.

Figure 17B:
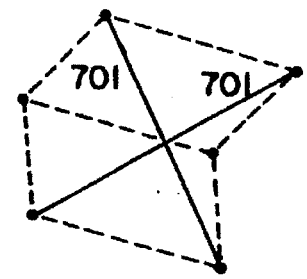

7.1 Diagonals 701 between surface corners of a base quad between two concatanated surfaces. FIG. 17B.

Figure 17C:
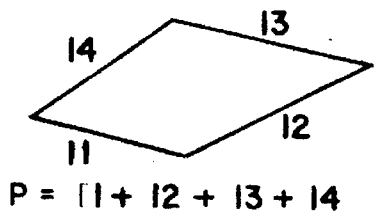

8.1 Perimeter of a base quad is the summation of all edge lengths. FIG. 17C.

Figure 17D:
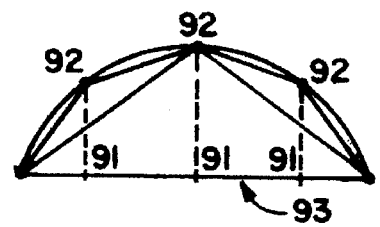

9.1 Projections are the ratio 91 of each projection height between isosceles triangle peaks 92 and the partial length of the edge base line 93. FIG. 17D.

Figure 17E:
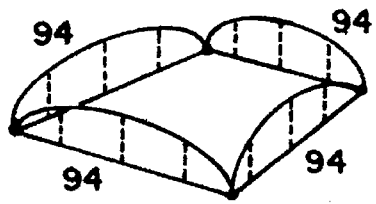

9.2 Surfaces have three edge projections 94 on a base quad. FIG. 17E.

Optionally, a knowledge or data base is created and stored for subsequent use to recognize more readily closed edges corresponding to optimum base figures. Scalar parameters such as lengths of base figure diagonals, measurements of corner angles, and base figure perimeter lengths are labeled, ordered and/or listed in any suitable manner by those skilled in the art to facilitate rapid and reliable recognition of optimum base figures for particular original surface edges, and also recognition of desired surface boundary points which will be discussed hereinafter. Optional processes B3a, B4a, B4b and B5 previously discussed may be executed. See also steps 21, 22, 30 of FIG. 4. In the step 21, generate vertex scalar paths of base quad corners. In the step 22, save a base quad. In the step 30, perform an inference of proportionality. The labeling, ordering and/or listing of data permits the method to acquire a degree of artificial intelligence (AI) with each interaction with a user-created closed edge. See, for example, U.S. Pat. No. 5,043,915, KNOWLEDGE BASED SYSTEM INSTALLED WITH ASSOCIATIVE/KNOWLEDGE AND INFERENCE METHOD, Aug. 27, 1991, which is hereby incorporated in its entirety by reference. For further AI approaches see, for example, DESIGNING ARTIFICIAL INTELLIGENCE BASED SOFTWARE, by A. Bahrami, Halsted Press 1988 and ARTIFICIAL INTELLIGENCE IN SOFTWARE APPLICATIONS, by B. W. Wah, IEEE 1988.

After determining or generating the optimum base figure (e.g., optimum base quadrilateral) according to step B and saving (at least temporarily) the base figure, the method proceeds to the steps C and D of FIG. 2. The essential step C is shown further explained in FIG. 5 (steps 1, 2a–2G, 4, 3A–3F) discussed hereinafter. Element 1.103 is a peak point lying on a surface edge section 1.104 (step 1), an optimum base quadrilateral is shown in dotted line segments (step 2a), a first plurality of isosceles triangles T1, T3, T2, T4 is shown forming a closed loop on the base quadrilateral (step 2a, step 2b), two straight line segments 202 connecting opposed peak points (opposed vertices 1.103) are shown in step 2b, a location vector 203 is shown in the step 2C. Note, e.g., that the four dotted line segments of FIG. 5B form (are) the four bases of the isosceles triangles T1, T3, T2, T4.

The location vector 203 is calculated or determined according to the following equation(s) and/or properties: Vector 203 is the unitized cross product of the two line segments 202; the resultant vector 203 position is coincident with a point having the closest proximate points on the vector perpendicular to both middle points on the line segments 202.

A first ratio $(h1+h3)/(h2+h4)$ is calculated in a step 2D, a set point 205 is initially located or positioned on the vector 203 according preferably to the following criteria of being a point on the vector 203 having the closest proximity to both middle points 204 (FIG. 5D) of the line segments 202, and a plurality of line segments 206 (FIG. 5F) is projected from the set point 205 to the peak points 1.103 of the isosceles triangles T1, T3, T2, T4 (step 2E). Typically, in the inventive method, the set point 205 (as clearly understood from, e.g., FIG. 5F) is initially located on the vector 203 at a location outside of a plane in which lie at least two line segments (e.g., two of the four dotted line segments shown in FIG. 5B) of the perimeter (e.g., dotted lines of FIG. 5B or 5C) of the base quadrilateral.

A second ratio is calculated having a numerator equal to the height of an isosceles triangle T5 and a denominator equal to the height of an isosceles triangle T6 (step 2F). See FIG. 5G. In a step 2G, the point 205 is moved or relocated to a location such that the reciprocal of $(h5/h6)=(h1+h3)/(h2+h4)$ (step 2G). A surface point 304 is then generated at that location LLH.304 (step 3A). See FIG. 5I.

The method continues with the steps 3B, 3C, 3D, 3E, 3F and 4 until a next succession (group) of isosceles triangles having peak points 1.103 coincident with the surface edges have approximately zero total rise (e.g., 0.01% of total run). See FIGS. 5J–5O.

As shown, the instant method positions boundary surface points by employing isosceles triangles added (or built upon) the outsides of previous triangle edges (e.g., step 3B, 3E) of FIG. 5. Each isosceles triangle of the instant method requires only two congruent legs. Thus, triangles initially having additional dimensional constraints such as equilateral triangles are not essential for the instant invention.

More specifically, in the steps of FIG. 5:

1 Locate the isosceles triangle LLH.303 having the greatest height for a surface edge section 1.104. FIG. 5A.

2.a Generate four isosceles triangles LLH.303 in a closed loop of triangle base points 201, triangles: T1, T2, T3, T4. FIG. 5B.

2.b Form two line segments 202 between triangle T1–T3 and T2–T4 peak points 1.103. FIG. 5C.

2.C Cross the vector coordinates of the lines 202 for the coordinates of this vector 203 placing vector 203 at the location perpendicular with the middle points 204 of the line segments 202. FIG. 5D.

2.D Calculate the ratio of the sum of triangles heights for T1 T3 to T2 T4. FIG. 5E.

2.E Place an arbitrary point 205 on the vector 203 followed by projecting four (4) line segments 206 downwardly from the point 205 to the peaks 1.103 of triangles T1, T2, T3, T4. FIG. 5F.

2.F Calculate the ratio of the triangle heights formed by the peak points of T1 and T3 with the point 205 T5 and peak points of T2 and T4 with the point 205 T6. FIG. 5G.

2.G Move point 205 on vector 203 to the location where the reciprocal of (h5/h6) is equal to (h1+h3)/(h2+h4). FIG. 5H.

Figure 5I:
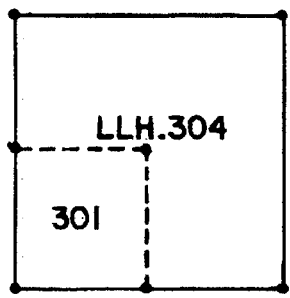
FIG. 5 shows a series of diagrams explaining the step C of FIG. 2.

3.A Generate a surface point for a quarter surface section 301 with one corner being the new surface point LLH.304. FIG. 5I.

Figure 5J:
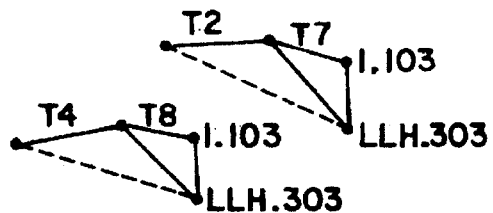

3.B Generate two new isosceles triangles T7 and T8 on opposing legs of T2 and T4. FIG. 5J.

Figure 5K:
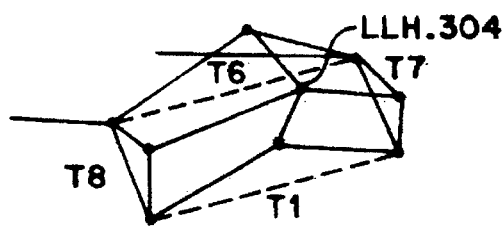

3.C Form a loop of four triangles T1, T6, T7, T8 and generate 2.b–2.G a new surface point LLH.304. FIG. 5K.

Figure 5L:
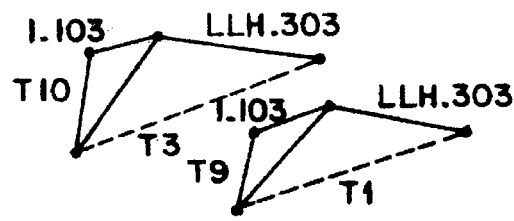

3.D Generate two new isosceles triangles T9 and T10 on opposing legs of T1 and T3 with this quarter section 301. FIG. 5L.

Figure 5M:
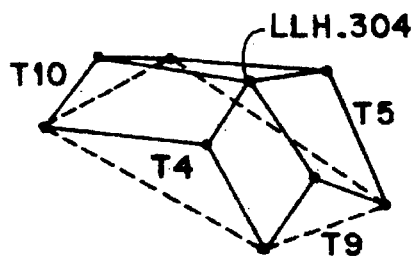

3.E Form a loop of four triangles T5, T10, T4, T9 and generate 2.b–2.G a new surface point LLH.304. FIG. 5M.

Figure 5N:
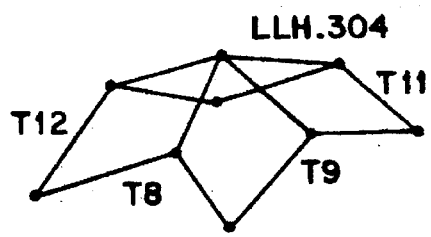

3.F Form a loop of four triangles T9, TS, the triangle formed with peak T1 to point 3.A LLH.304 to peak 3.C LLH.304 T11, the triangle formed with peak T2 to point 3.A LLH.304 to peak 3.E LLH.304 T12 and generate 2.b–2.G a new surface point LLH.304. FIG. 5N.

Figure 5O:
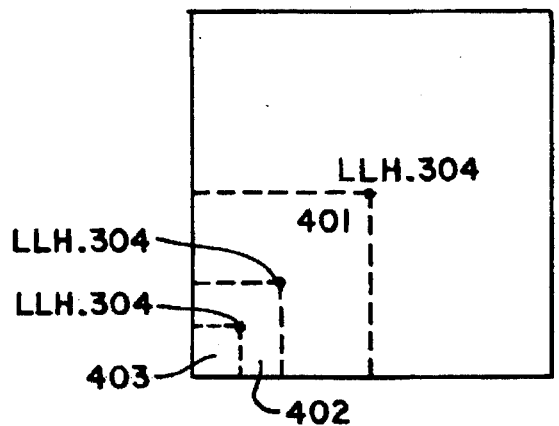

4 Steps 3.C and 3.E are repeated over the original line 2.E 205 to 1.103 T1 to subsequent lines from the new quarter sections 401, 402, 403 so that steps 2.b–2.G are repeated in the quarters. FIG. 5O.

FIG. 7 shows 12 useful primitives, SSL, LLS, LLH, HHL, HHS, SSH, SSB, BBS, LLB, BBL, HHB, BBH, (rules) which optionally can be utilized for additional clarification of the instant invention. Alternatively, a primitive as used herein may be defined as an infinitesimal change of state in a computer relative to the consistency of either three remaining states that in the entirety of the twelve primitives comprise the complete descriptions of the required hardware variations used to recompose a surface.

Figure 7A:
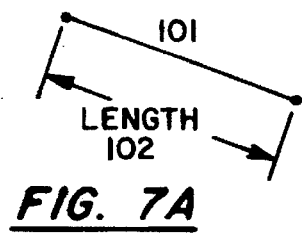
FIG. 7 shows a list of diagrams for 12 primitives useful for further understanding the example of FIG. 6 and, among others, the knowledge base of an optional feature of the invention.

More specifically:

SSL is a scalar scalar line primitive where the scalar varies as a distance measurement 102 relative to a single line segment 101. FIG. 7A.

Figure 7B:
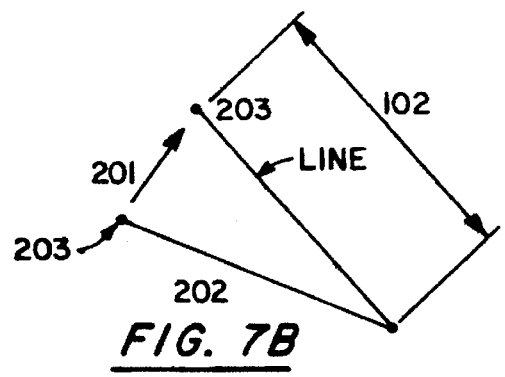

LLS is a line line scalar primitive where the position 203 of the line varies by an increment 201 of length 102 relative to an existing line 202. FIG. 7B.

Figure 7C:
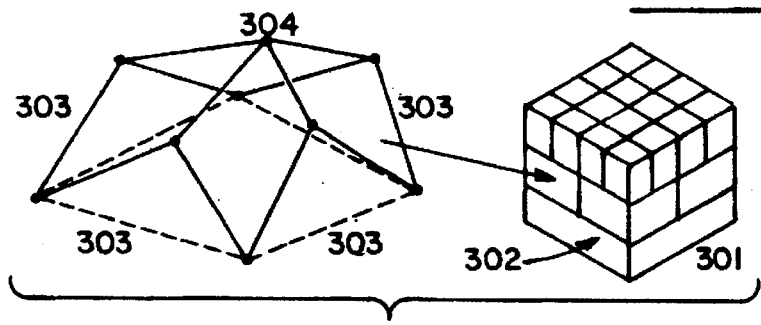

LLH is a line line history primitive where the history is a surface array 301 of elements and the data is a loop of four isosceles triangles 303 and one surface point 304 in a storage element 302 comprising the description of a surface. FIG. 7C.

Figure 7F:
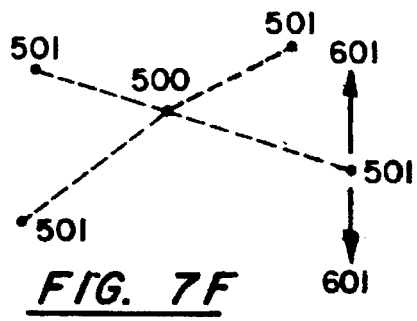
Figure 7D:
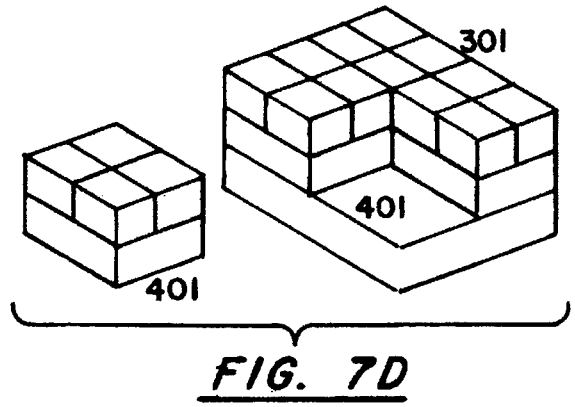

HHL is a history history line primitive where the history varies as any number of array elements 401 within a surface array 301 comprising a description of a sub surface. FIG. 7D.

Figure 7E:
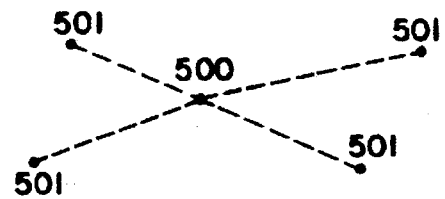

HHS is a history history scalar primitive where the history varies relative to the scalar data with history described as surface data 500 and attached parameters 501 (eg, lengths of base figure edge). FIG. 7E.

SSH is a scalar scalar history primitive where the scalar magnitudes of parameter data 501 vary 601 relative to prior data history 500. FIG. 7F.

Figure 7G:
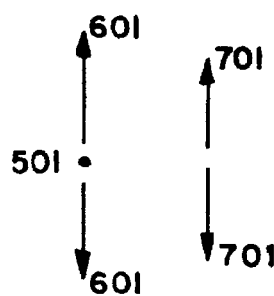

SSB is a scalar scalar boolean primitive where the scalar magnitudes of parameters 501 are increments of change 601 that are decremented typically by a half for each false boolean response 701. FIG. 7G.

Figure 7H:
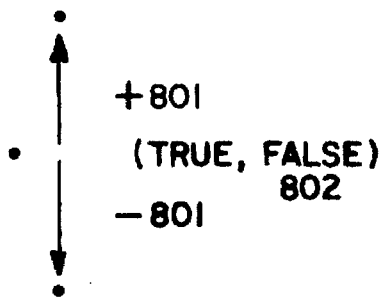

BBS is a boolean boolean scalar primitive where the sign direction 801 of a scalar increment 701 is reversed as the function of a false boolean response 802 out of a true or false possible outcome. FIG. 7H.

Figure 7I:
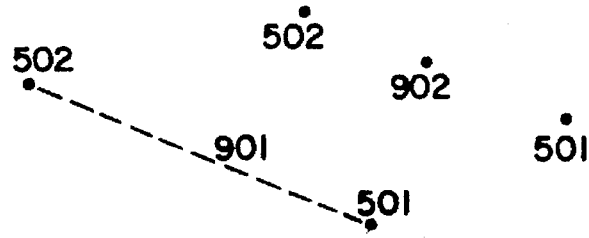

LLB is a line line boolean primitive where the line 901 is the acceptance (true) or rejection (false) 902 of a parameter 501 relative to a boolean affirmation. FIG. 7I.

Figure 7J:
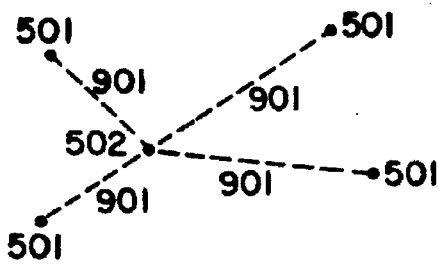

BBL is a boolean boolean line primitive where the boolean true or false label (true 901) is permanently applied to a parameter 501 as a record of acceptance 901 or rejection 902. FIG. 7J.

Figure 7K:

HHB is a history history boolean primitive where the direction 1101 of the history is the true or false label 1102 of the boolean operator, true is a direction and false is the negate of any direction along a path section 1103. FIG. 7K.

Figure 7L:
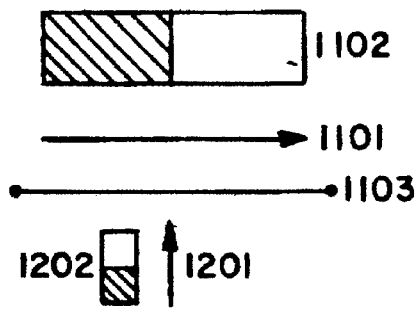

BBH is a boolean boolean history primitive where the boolean operator is the direction 1101 of a history section 1103 relative to the inference of one logic step 1201. FIG. 7L.

CREATING DATABASE (KNOWLEDGE BASE KB) FOR ARTIFICIAL INTELLIGENCE

Figure 8:
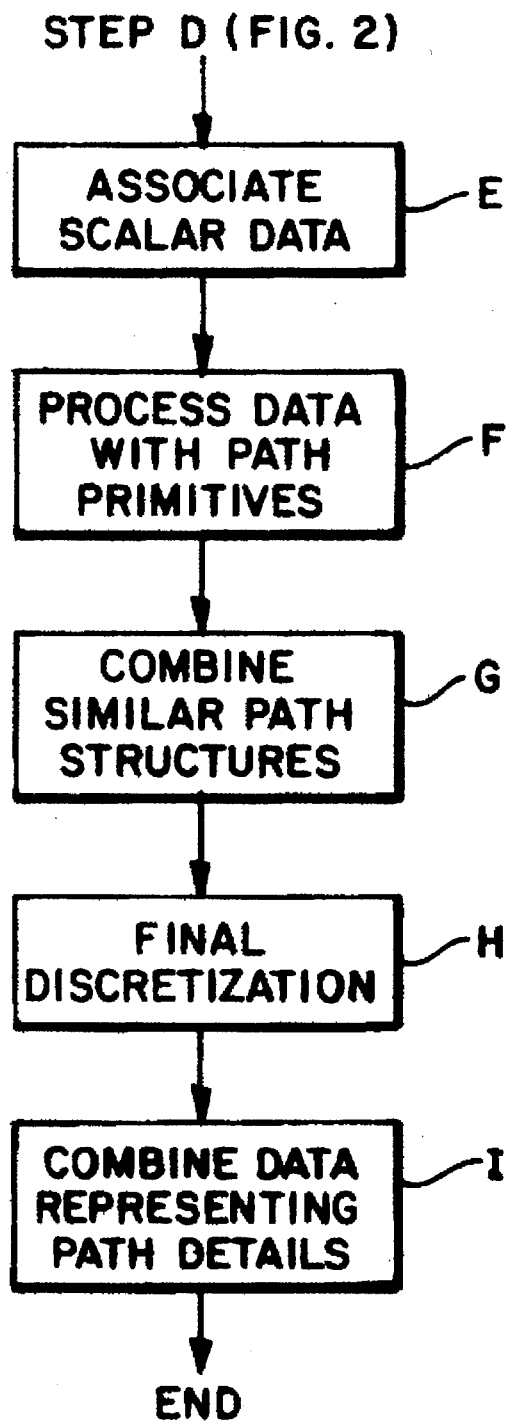
FIG. 8 is a high level flow chart showing additional optional steps E–I according to the invention.
Figures 2, 11:
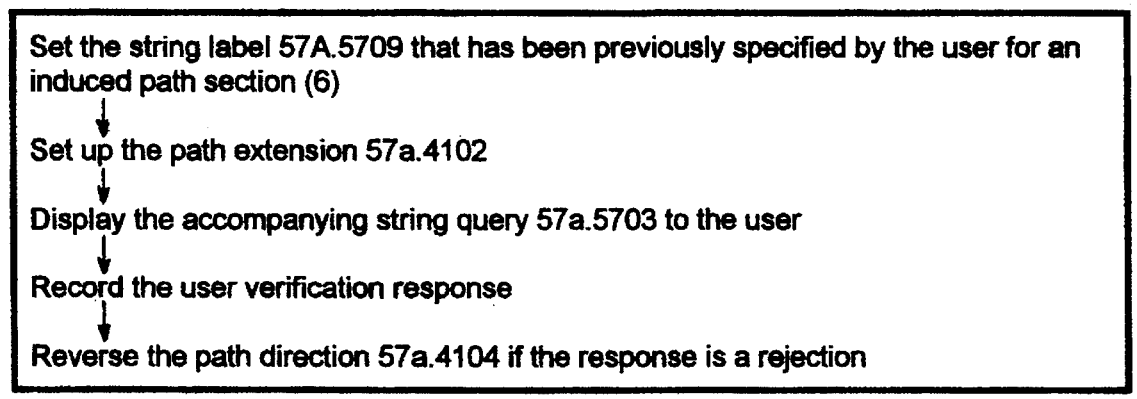

Optionally, a knowledge base KB can be created and used in the inventive method. See FIGS. 8–16. The steps E–I of FIG. 8 optionally may be performed subsequent to the step D of FIG. 2.

Binary tree data structures are the record of switching from one path point to the other within the context of a parent path point. Inference is recorded as binary tree sections having two child path points both inheriting the single parent point. Binary trees are the global connectivity of the process which converts logic steps into data structures. The inference of data continuously decomposes it to the base level of the 12 path primitives.

Path induction is the continuation of the alternate two points within a binary section relative to the single inference of either a label, data from the KB, or referral to the user. By specifying a path point label or confirming the induction of a point, data is formed out of the path sections into a generalization and partitioned from the scalar variation of the attached parameters. The local connectivity of path points from the current label BBL.501 (see explanation 5 for FIG. 13A, and FIG. 7J) is stored with the current label by the reference lines and accompanying acceptance LLB.902. Path data contained within the label is used to emulate the generalizations of surrounding scalar data having identical parameter types and connectivity with those parameters. Localized scalar comparisons are combined into interconnected larger path structures that are connected in with the binary tree structure as a succession of labels within the recorded inheritance of the process itself.

Paths of user interaction are records of the potential deduction of more specific data from the KB, the confirmation or rejection of a label, or of a child path point within the context of an existing parent point. Inheritance is the direction of confirmation within the binary tree structure marked in each binary tree section using combined BBH and HHB primitives 41.4101 (element 4101 of explanation 41), 4102, 4103 of FIGS. 14A, 14B, 14C. The two sources of potential information lie along the direction 4104 in explanation 41 of FIGS. 14A, B,C relative to the opposite path point. The existence of a label on data within the KB relative to a recorded user acceptance or rejection is the automatic response to future inferences of the same data. An extension of this property is using the recorded inheritance of identical path points to verify induction. Inheritance of the path relative to the potential inference is labeled within a path point by the HHB.1102 direction label. Marking the direction of a logic step BBH.1203 is the replication of the affirmation label HHB.1102 (FIG. 7K) pointing to the source of information combined into the single function of both the HHB and BBH primitives. By maintaining the relationship between the three data sources, paths are extended from the binary section independent of the processes that took place prior to the extension.

The process inference mechanism is the outward emulation of geometry relative to the inward decomposition of data ultimately converging to a path point existing as one of the twelve path primitives. All inferences produced from path induction extend from the background set of primitives to the geometry display on a CRT (see FIG. 18). Logic steps at the initial stages of developing new geometry begin with the consolidation of surface geometry that matches the data used by one of the 12 path primitives. Primitives LLH (FIG. 7C) and HHL (FIG. 7D) are used simultaneously to develop surface sections LLH.302 by combining four isosceles triangles LLH.303 that start the recomposition of a surface. An advantage to describing the totality of the process with the set of twelve path primitives lies in the ability to generate a true inference regardless of whether the data combined with any one primitives is gotten from inductive or deductive processes. The ability to transform the results of data association into the inference mechanism is extended to the record of the process contained in the path point data structure. Binary paths are the geometry that the eight primitives containing either one of the boolean or history identities manipulates as though the paths were external data. This is a desirable feature that has the inherent capacity to be operated from within itself regardless of the level of dynamism in the actual data.

Rejection of an inference is an inflection point 22.2201 (FIG. 13D) that is inserted back into the process for emulating scalar variations of the parameters associated with the inflection point geometry. Reversal of the path direction 22:2202 is the decrement of successive inferences describing geometry based on and ultimately ending with a single path primitive. A reduction of the volume of geometry similarly decreases the amount of attached parameters 22.503. The result is the smoothing of the initial surface to within an average of the original data representing the remaining path generalization. Desirable geometric details are then added to the smooth surfaces either as the insertion of original geometry scaled into place or additional geometry subsequently developed by the user.

Figure 13A:
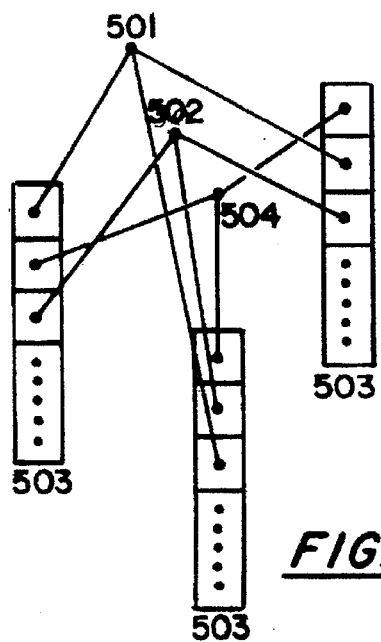
FIGS. 13–16 are diagrams useful for understanding FIG. 9–12.
Figure 13B:
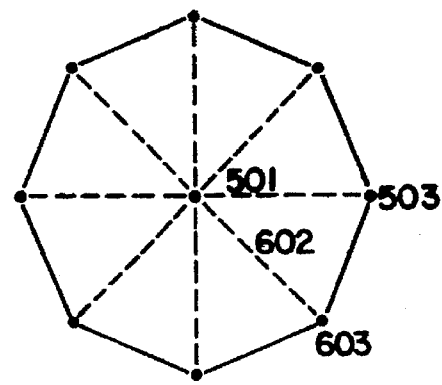

Inference of data is the linear increment of a path point from identical parameters 5.503 having a combined closest percent similarity 5.502. FIG. 13A. Geometry is combined into a single path point 5.501 described by a periphery 6.602 of parameters HHS.501. Locating data HHS.502 having the closest similarity gotten from the KB automatically infers the magnitudes of connected scalar data 6.602 with respect to the points having identical generic structures 603. The scalar differences SSH.601 in the parameter 5.563 scalars are the magnitudes SSB.701 of alteration along a scalar path proportional to the most similar data from the KB and vice versa. An example is the use of the proportionality of the base quadrangle B5.1102 (FIG. 3) used to alter corners B2b.1,2,3,4 to location B3a.58c.5807. Scalar paths are applied to common line segments of two geometries and are used to move a point on one line LLS.202 of the lines to some new position LLS.203. FIG. 7B. Incrementing BBS.801 is a logic step commonly referred to the user for affirmation of the resulting geometric configuration.

Varying the magnitude SSL.102 of the total scalar path spread B3a.58.5804 (FIG. 3E) along a line segment SSL.101 simulates an inflection point by increasing the potential for similarity with other similar geometric data that is proportional within the context of the geometry label. Scalar paths are proportional to data having identical parameters 6.503 and the closest percent similarity 6.501.

Figure 14A:
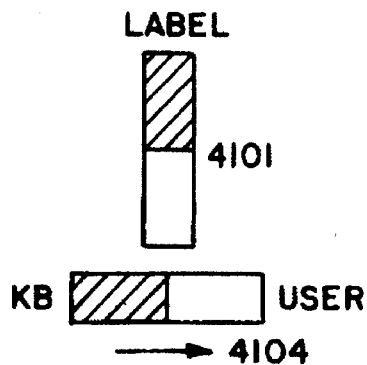
Figure 14B:
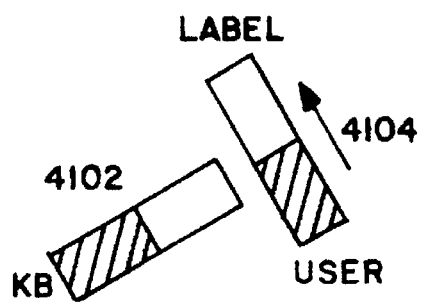
Figure 14C:
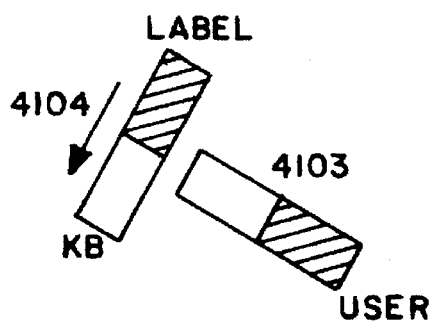
Figure 15A:
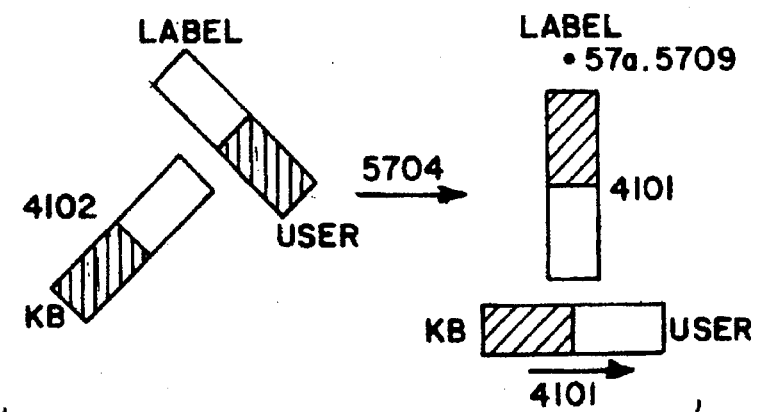
Figure 15B:
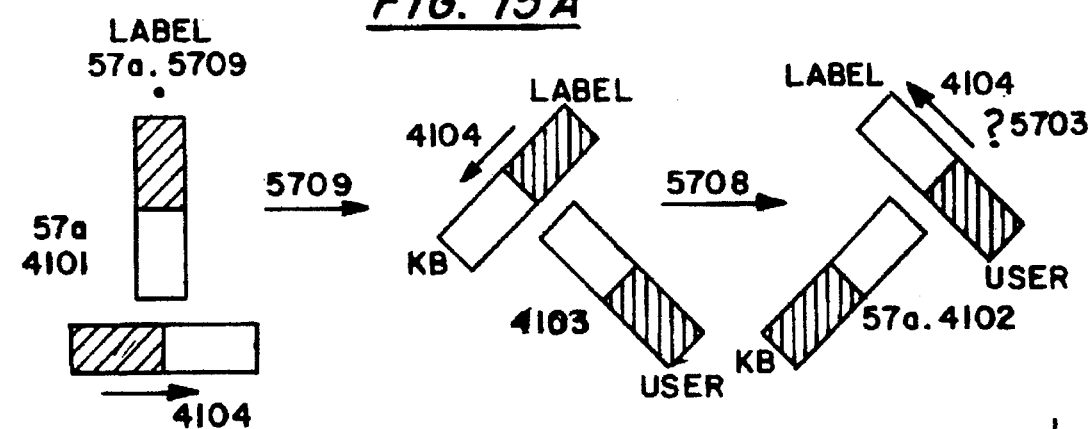
Figure 15C:
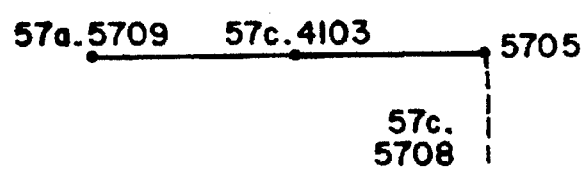

Embedding binary sections of user interaction item 41 (FIGS. 14A, 14B, 14C) into binary path structures is the substitution of the process within itself. Confirmation of a parent point is the signal for later automatic affirmation of induced path data inheriting previous user interaction records. The paths are linear records of user interaction, geometry, and scaling contained in the same data structure in the reverse of the initial user manipulation of geometry. This maintains consistency with the inward processing of the inference mechanism. By building data in the general format of the 12 path primitives, only relevant vector locations are recorded within the global data structure. In the limit of logic steps, the association 57.5701 of inference within the data structure becomes negligible. The logic steps remaining are described by the KB-user-label 57.a,b,c structure of the binary sections. Discrepancy introduced by the discretization are shifted 57B.5704, 57c.5708, 57a.3705 in the order of 41.4102, 41.4101, to 41.4103. Cycling through each perspective 57b.a,b,c creates a path section extension 57d.5702 describing the context by which specific data is inferable using path induction. Maintaining the context of the three perspective cycles is the instruction of where the data is located in order to be guaranteed to be a detail of the general path. Any one of the binary sections within a structure is inferable from the other two by association. The result is the capacity to deduce specific data from some larger path scope defined as a single path point label 57a.5709. FIGS. 15A, 15B, 15C.

1.) Paths are converted into geometry relative to the eight primitives containing either or both of the boolean and history identities;

2.) Scalar magnitudes describing geometric configurations are proportional to similar geometry;

3.) Binary path data structures are the base for the deduction of specific data from parent path generalizations;

4.) Associating data with the functions in any one of the 12 path primitives is an inference, and 5.) All logic steps are transformed into inferences through the inheritance of one or more of the 12 primitive functions.

To recapitulate:

5 Comparisons with other scalar data 502 are done within the context of identical parameter types 503 with respect to an original piece of data 501. FIG. 13A.

6 Parameter applications to a single entity 501 form a generic figure of evenly spaced parameter points 603 located 602 with respect to the scalar magnitude of each parameter list 503.

Figure 13C:
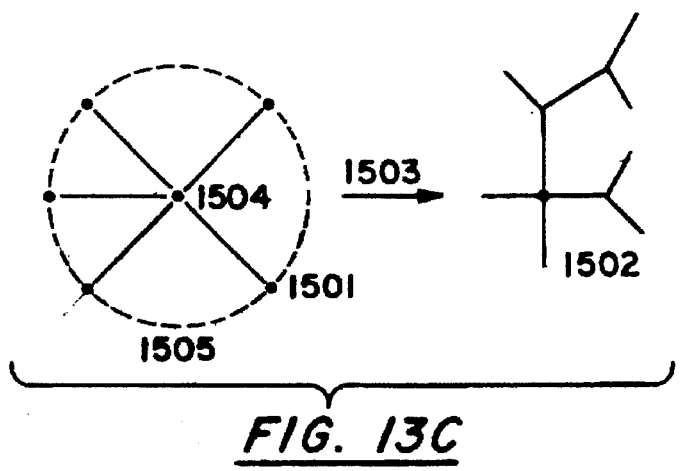

15 Generic labels 1504 shift processing of the generalizations to a total data set 1505 so that the trivialization of parameters 1501 is the conversion 1503 of the set 1505 into generalized paths 1502. FIG. 13C.

Figure 13D:
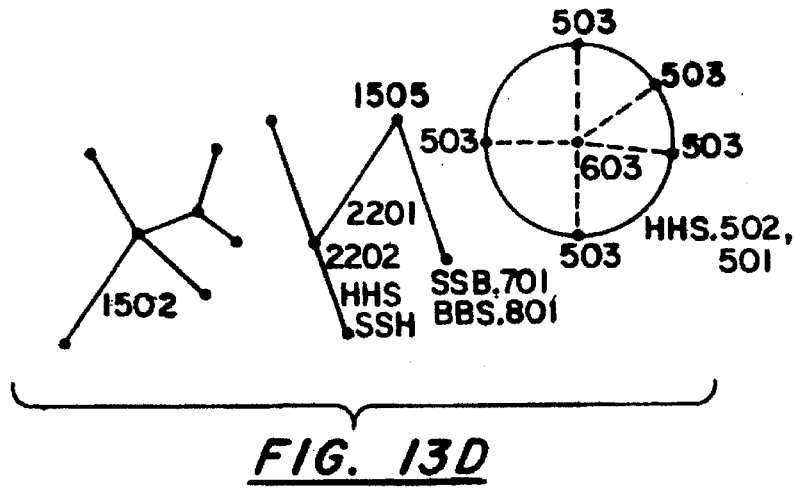

22 Primitive group HHS-SSH-SSB-BBS 2202 is an inflection point 2201 in a path 1502 that reshapes a generalization 1201 relative to a matching other scalar magnitude of a parameter list 503. FIG. 13D.

41 Direction of affirmation from either the KB to the user 4101, user to labels 4102, or labels to the KB 4103 is the inference of the existence of the process itself from the other entity, labels 4101, KB 4102, or the user 4103. FIG. 14A, FIG. 14B, FIG. 14C.

Figure 14D:
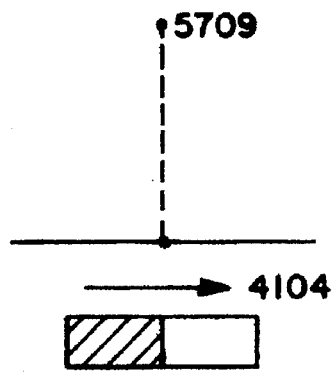

57 Convergence with the boolean direction 4104 of the BBH.1101 and HHB.1101 primitives is convergence with an inference point 5709 relative to the boolean direction 4104. FIG. 14D.

Figure 14E:
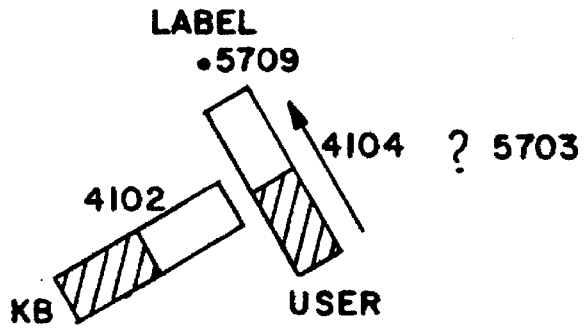

57a Point convergence is checked with the user 4102 as the affirmation of direction 4104 and is initiated externally marked by a question string ? 5703 attached to the label of the point 5709. FIG. 14E.

57B Affirmation of the point 57a.5709 switches 5704 the process to the label 4101 that inferred the direction of the path section 4104. FIG. 15A.

57c Affirming points inherited with a label 57a.5709 switches 4103 the process to record the affirmation of inherited points from the KB to the user for affirmation 5708 of a label 57a.4102. FIG. 15B.

57d Direction of affirmation along the path section is used as a point extension 5705 inferred 57c.4103 need for user interaction 57c.5708. FIG. 15C.

Figure 16:
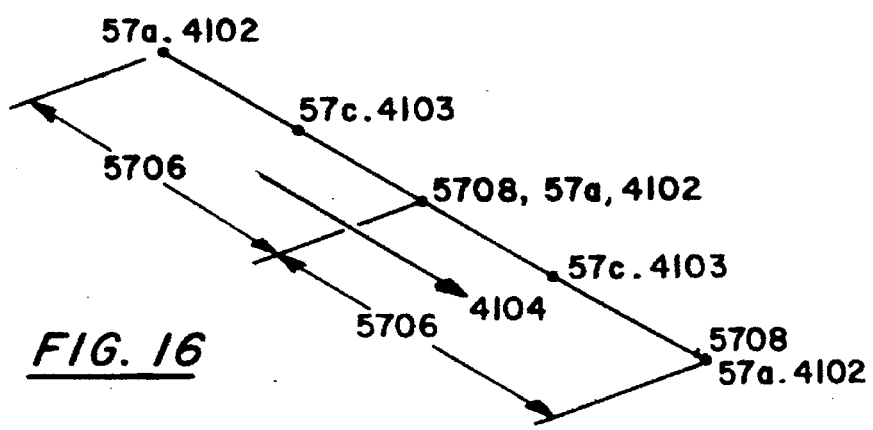

57e Interaction using labels and user affirmation 4104 result in serial record paths 5706 ending at a negate boolean user response. FIG. 16.

Figure 18:
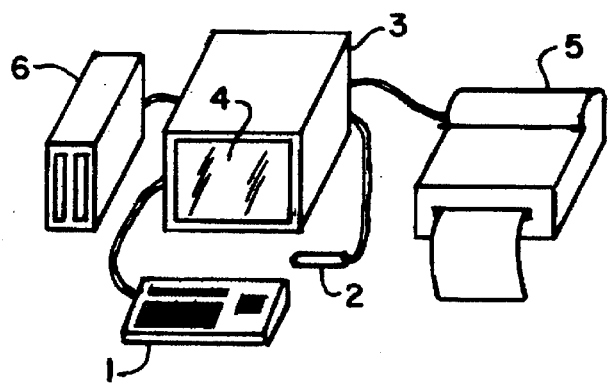
FIG. 18 is a schematic diagram of an electronic computer system in which a preferred embodiment of the invention is implemented.

Finally, implementing the invention, e.g., in software or otherwise coding software (e.g., instructions and data) for the steps of FIG. 2, 3, 4, 5, FIGS. 8, 9–16 of the instant invention is well within the skill of the art in view of the instant disclosure. FIG. 18 shows, interconnected, a light pen or mouse 2, keyboard 1, processor (e.g., CPU, etc.) external memory 6, display 4 and printer 5, in which the instant invention may be implemented.

While there has been shown and described what is at present considered preferred embodiments of the present invention, it will be understood by those skilled in the art that various changes and modifications may be made therein without departing from the spirit and scope of the invention is defined by the appended claims.

What is claimed is:

1. A computerized method for generating boundary surface points, comprising:

providing an electronic computer, the electronic computer including a memory having stored therein instructions and data for performing steps (a)–(j);

performing the steps (a)–(j) by means of executing the instructions and data within the computer;

(a) detecting a closed edge;

(b) determining a base figure having edges forming corners coincident with the closed edge;

(c) generating, after performing said step (b) of determining a base figure, first, second, third and fourth isosceles triangles having: (i) peak points coincident with points on the closed edge, and (ii) bases colinear and equal to edges of the base figure to form a closed loop on the base figure, and (iii) heights extending from the bases to the peak points;

(d) determining two line segments connecting the peak points of the first and third and the peak points of the second and the fourth isosceles triangles;

(e) determining a location vector orthogonal to middle points of the two line segments;

(f) calculating a first ratio equal to a sum of the heights of first and third isosceles triangles divided by a sum of the heights of the second and fourth isosceles triangles;

(g) locating a set point to a first location on the location vector, the first location being outside of a plane in which at least two edges of the base figure lie;

(h) projecting a plurality of line segments from the set point to the peak points of the first, second, third and fourth isosceles triangles;

(i) calculating a second ratio having a numerator equal to a height of a fifth isosceles triangle whose peak point is formed by the set point and whose base is formed by one of the two line segments, and having a denominator equal to a height of a sixth isosceles triangle whose peak point is formed by the set point and whose base is formed by the other of the two line segments;

(j) relocating the set point on the location vector to a new location where the second ratio equals a reciprocal of the first ratio, and then generating a boundary surface point at the new location, and wherein each isosceles triangle of said method has two respectively congruent legs, each respectively congruent leg being unequal to the respective base.

2. A method as claimed in claim 1, wherein the memory further includes instructions and data for performing steps k and l, the method further comprising executing the instructions and data so as to perform the steps (k) and (l) in the computer system:

(k) generating seventh and eighth isosceles triangles having respective bases formed by and equal to respective legs of the second and fourth isosceles triangles, and (l) forming a closed loop including the bases of the sixth, seventh and eighth isosceles triangles and the base of the first isosceles triangle.

3. A method as claimed in claim 1, further comprising the step of:

(k) generating seventh and eighth isosceles triangles having peak points coincident with points on the closed edge, the points coincident with the peak points of the seventh and eight isosceles triangles differing from the points coincident with the peak points of the first, second, third and fourth isosceles triangles.

4. A method as claimed in claim 1, wherein said step of (b) determining a base figure further comprises determining a base figure whose edges at the corners form respective angles closest to 90 degrees and whose perimeter within the closed edge is the longest.

5. A method as claimed in claim 4, wherein said step of (b) determining a base figure includes determining a base quadrilateral having edges forming corners coincident with the closed edge.

6. A method as claimed in claim 5, wherein said step of (b) determining a base figure further comprises determining a base figure having a smallest total length of projections extending from the base figure to the closed edge.

7. A method as claimed in claim 6, wherein each of the projections of said step of (b) determining is normal with the edge of the base figure from which the projection extends.

8. A computerized method for generating boundary surface points, comprising:

provifing an electronic computer system, the electronic computer system including a memory having instructions and data for performing steps (i),(ii),(iii), and (iv);

executing the instructions and data so as to perform the steps (i), (ii), (iii) and (iv) in the computer system:

(i) detecting a closed edge;

(ii) determining a base figure for the closed edge, the base figure having a perimeter including a first plurality of line segments, at least two of the line segments lying in a plane;

(iii) locating a boundary surface point, said locating step including:

generating, after performing said step of (ii) determining a base figure, a first plurality of isosceles triangles, each isosceles triangle of the first plurality having two respectively congruent legs and a respective base, the respective base also being a respective one of the first plurality of line segments of the perimeter of the base figure, each respective base being incongruent to each of the two respectively congruent legs, and each isosceles triangle having a respective vertex coincident with a respective point on the closed edge, determining a location vector formed by a unitized cross product of other line segments which connect the vertices of the first plurality of isosceles triangles, generating a second plurality of isosceles triangles, the second plurality of isosceles triangles having a common vertex at a first location on the location vector and having bases which are the other line segments connecting the vertices of the triangles of the first plurality, each isosceles triangle of the second plurality including two respectively congruent legs, each respective base being incongruent to each of the two respectively congruent legs, the first location being outside of the plane in which the at least two line segments lie, calculating a height of each triangle of the first plurality, calculating a first ratio of sums of the heights of the first plurality of isosceles triangles, calculating a height of each triangle of the second plurality, calculating a second ratio of the heights of the second plurality of isosceles triangles, comparing the second ratio to the first ratio, moving the common vertex along the location vector to a second location at which a reciprocal of the second ratio equals the first ratio, said moving step including maintaining the first ratio as a constant; and then (iv) generating a boundary surface point at the common vertex at the second location.

9. A method as claimed in claim 8, wherein said step of (ii) determining includes determining a base figure including a base quadrilateral within the closed edge, the base quadrilateral having a perimeter consisting of four line segments, and wherein the first plurality is four and the second plurality is two.

10. A method as claimed in claim 8, wherein said step (ii) of determining includes determining an optimum base quadrilateral, the optimum base quadrilateral having a largest perimeter within the closed edge.

11. A method as claimed in claim 10, the optimum base quadrilateral further having all angles closest to 90° on the closed edge.

12. A method as claimed in claim 11, the optimum base quadrilateral further having a smallest total length of projections, each projection beginning at the base quadrilateral and ending at the closed edge.

13. A method as claimed in claim 8, wherein said step of (ii) determining a base figure further includes storing in a database parameters corresponding to the base figure.

14. A method as claimed in claim 13, wherein said storing step includes storing in a binary tree database structure parameters corresponding to the base figure.

15. A method as claimed in claim 8, wherein said step of determining a base figure further includes creating data according to a line line boolean primitive wherein a line is an acceptance (true) or a rejection (false) of the data relative to a boolean affirmation.

* * * * *